US011199606B2

(12) United States Patent
Midathala

(10) Patent No.: US 11,199,606 B2
(45) Date of Patent: Dec. 14, 2021

(54) INDOOR TRACKING SYSTEM

(71) Applicant: ZEN TECHNOLOGIES LIMITED, Hyderabad (IN)

(72) Inventor: Ravi Kumar Midathala, Hyderabad (IN)

(*) Notice: Subject to any disclaimer, the term of this patent is extended or adjusted under 35 U.S.C. 154(b) by 382 days.

(21) Appl. No.: 16/317,568

(22) PCT Filed: Jul. 14, 2017

(86) PCT No.: PCT/IB2017/054257
§ 371 (c)(1),
(2) Date: Jan. 14, 2019

(87) PCT Pub. No.: WO2018/011755
PCT Pub. Date: Jan. 18, 2018

(65) Prior Publication Data
US 2019/0293744 A1 Sep. 26, 2019

(30) Foreign Application Priority Data
Jul. 14, 2016 (IN) .............................. 201641024059

(51) Int. Cl.
G01S 5/14 (2006.01)
H04W 4/029 (2018.01)
H04W 4/33 (2018.01)
G01S 5/02 (2010.01)
H04W 64/00 (2009.01)
H04W 4/02 (2018.01)
G01S 5/00 (2006.01)

(52) U.S. Cl.
CPC ................. *G01S 5/14* (2013.01); *G01S 5/00* (2013.01); *G01S 5/0221* (2013.01); *H04W 4/02* (2013.01); *H04W 4/029* (2018.02); *H04W 4/33* (2018.02); *H04W 64/00* (2013.01)

(58) Field of Classification Search
CPC ............ G01S 5/14; G01S 5/00; G01S 5/0221; H04W 4/02; H04W 4/029; H04W 4/33; H04W 64/00
See application file for complete search history.

(56) References Cited

U.S. PATENT DOCUMENTS

| 7,519,372 B2 | 4/2009 | MacDonald et al. | |
| 2008/0180246 A1* | 7/2008 | Malik | G06K 7/10356 340/572.1 |
| 2014/0228059 A1* | 8/2014 | Jalali | H04W 4/33 455/456.6 |
| 2016/0139576 A1* | 5/2016 | Aiken | H05B 47/19 700/276 |
| 2016/0158625 A1* | 6/2016 | DeAngelis | H04W 4/029 340/539.13 |
| 2017/0139032 A1* | 5/2017 | Ro L | G01S 5/0226 |

(Continued)

FOREIGN PATENT DOCUMENTS

| AU | 2002307149 A1 | 10/2002 |
| TW | 200841036 A | 10/2008 |

*Primary Examiner* — Timothy X Pham
(74) *Attorney, Agent, or Firm* — Rumit R. Kanakia

(57) ABSTRACT

An indoor tracking system to track a location of a tag in a room. The system comprises of an initiator to initiate the tag, anchors placed at the corners of the room to track the location of the tag and to communicate data to a base station and a room intervention device provided to change a room identification (ID) and a floor identification (ID).

14 Claims, 3 Drawing Sheets

(56) References Cited

U.S. PATENT DOCUMENTS

2017/0142549 A1* 5/2017 Herbert ................ H04W 4/021
2017/0230801 A1* 8/2017 Amsalem ............... H04W 4/33
2017/0296301 A1* 10/2017 Dor ........................ A61B 90/98

* cited by examiner

INDOOR TRACKING SYSTEM

TECHNICAL FIELD OF INVENTION

The present invention relates to an indoor tracking system to track a location of a player in a predetermined range.

BACKGROUND OF THE INVENTION

Indoor tracking systems are used for track a location of a person or an object within a building and used to communicate data to a base station. In general there are several types of local positioning systems that enable tracking and identifying a location of objects in real time. Several local positioning systems are commercialized and are available in market that are manufactured by using various optical, radio or even acoustic technologies.

The simplest systems use expensive tags and beacons to determine their location. The tags need readers on every point where the position should be determined and it is not possible to install them across the whole area. Bluetooth beacons can send signals but can't receive signals, they are comparatively cheap and works only in the maximum range of 30 meters indoors and accuracy is only up to one meter.

These systems cannot perform perfect or accurate tracking of location in a building having plurality of rooms & floors and delays the transmission of data to the base station.

Therefore, to overcome the above limitations there is need to develop an indoor tracking system that works more accurately and efficiently.

BRIEF SUMMARY OF THE INVENTION

According to a first aspect of the present invention, an indoor tracking system for tracking a location of a tag in a pre-determined range and communicate the data to a base station is disclosed. The indoor tracking system as disclosed comprises an initiator, a plurality of anchors to track an exact position of the tag in the room, plurality of Room Intervention Devices (RID's) to switch a room ID and a base station to monitor the position of tags, wherein said tags are moving subjects which are equipped with the transceiver for communication. Moving subjects include people, animal, object or vehicle, etc.

In accordance with the first aspect of the present invention, the initiator initiates the tags when entered in to the pre-determined range of the initiator, by initiating the tags to communicate with the anchors.

In accordance with the first aspect of the present invention, wherein each tag, anchor and initiator is fed with a plurality of unique ID's.

In accordance with the first aspect of the present invention, the anchors are provided for tracking the location of tags, where it is mandatory to have at least three anchors in each room for seamless and error free tracking. All anchors belonging to the room transfers the tag data to the base station to track the tags inside a room.

In accordance with the first aspect of the present invention, a Room Intervention Device (RID) is used to switch a channel, each room belonging to a floor uses a different channel ID and a room ID. The RID's are placed at every entrance and exit points of a room to ensure the tag belongs to that room of a floor.

In accordance with the first aspect of the present invention, the system comprises a base station to get a report of tag information and exact location to continuously monitor the exercises of the tags.

According to a second aspect of the present invention, a method to operate the indoor tracking system to track a location of a tag is disclosed. The method comprises steps of affixing an initiator in the room or building to initiate the plurality of tags, providing a plurality of anchors at each corner of the room or building for seamless and error free tracking and communicating with the anchors, on initiating the tags.

In accordance with the second aspect of the present invention, further the method comprises steps of placing Room Intervention Device (RID) at every entrance and exit of a room or building to ensure the said tag belongs to the particular room of the floor and transferring the tag data to the base station to track the tags inside the room.

In accordance with the second aspect of the present invention, where in each tag, anchor and initiator are fed with unique ID's.

DETAILED DESCRIPTION OF THE INVENTION

It is to be understood that the present disclosure is not limited in its application to the details of construction and the arrangement of components set forth in the following description. The present disclosure is capable of other embodiments and of being practiced or of being carried out in many ways. Also, it is to be understood that the phraseology and terminology used herein is for description and should not be regarded as limiting.

On the contrary, it is intended to cover alternatives, modifications and equivalents. Various modifications to the present invention will be clear to a person skilled in the art, and can be made to the present invention within the spirit and scope of the invention.

The present invention relates to an indoor tracking system for tracking a location of a plurality of tags in a building where there is no chance of getting GPS signals.

Figure 1:
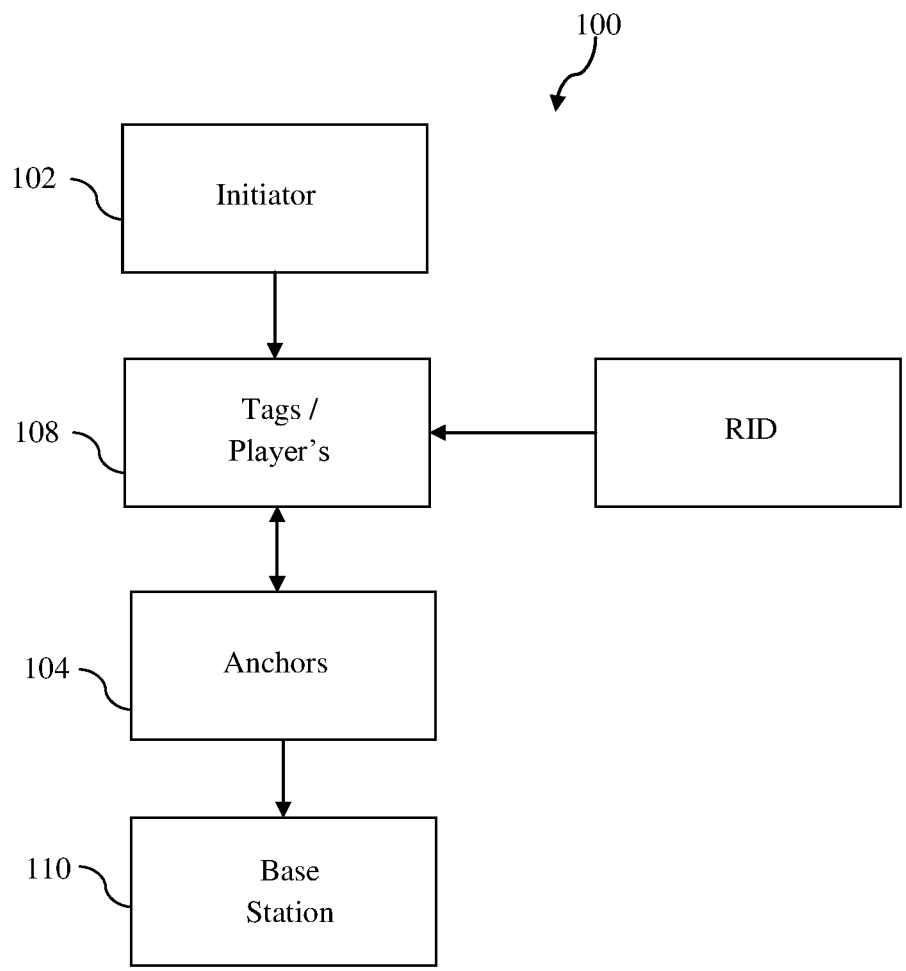
FIG. 1 illustrates a block diagram depicting an indoor tracking system according to the present invention.

Referring to the drawings, FIG. 1 illustrates a block diagram depicting an indoor tracking system (100) according to the present invention. The indoor tracking system comprises tags which are moving subjects equipped with the transceiver for communication, wherein the moving subjects include people, animal, object or vehicle, etc. The indoor tracking system further comprises an initiator (102) to initiate the tags (108) when entered in to the pre-determined range of the initiator (102) and to activate the anchors. On initiation, the tags (108) communicate with the anchors (104), wherein each tag (108), anchor (104) and initiator (102) are fed with unique ID's.

Anchors (104) are provided for tracking the location of tags (108) by measuring the tag distance from each anchor and automatically calibrate the exact position in the room, it is mandatory to have three anchors in each room for seamless and error free tracking. All anchors (104) belonging to a room transfer the tag data to the base station (110) to track the tags (108) inside a room.

Figure 2:
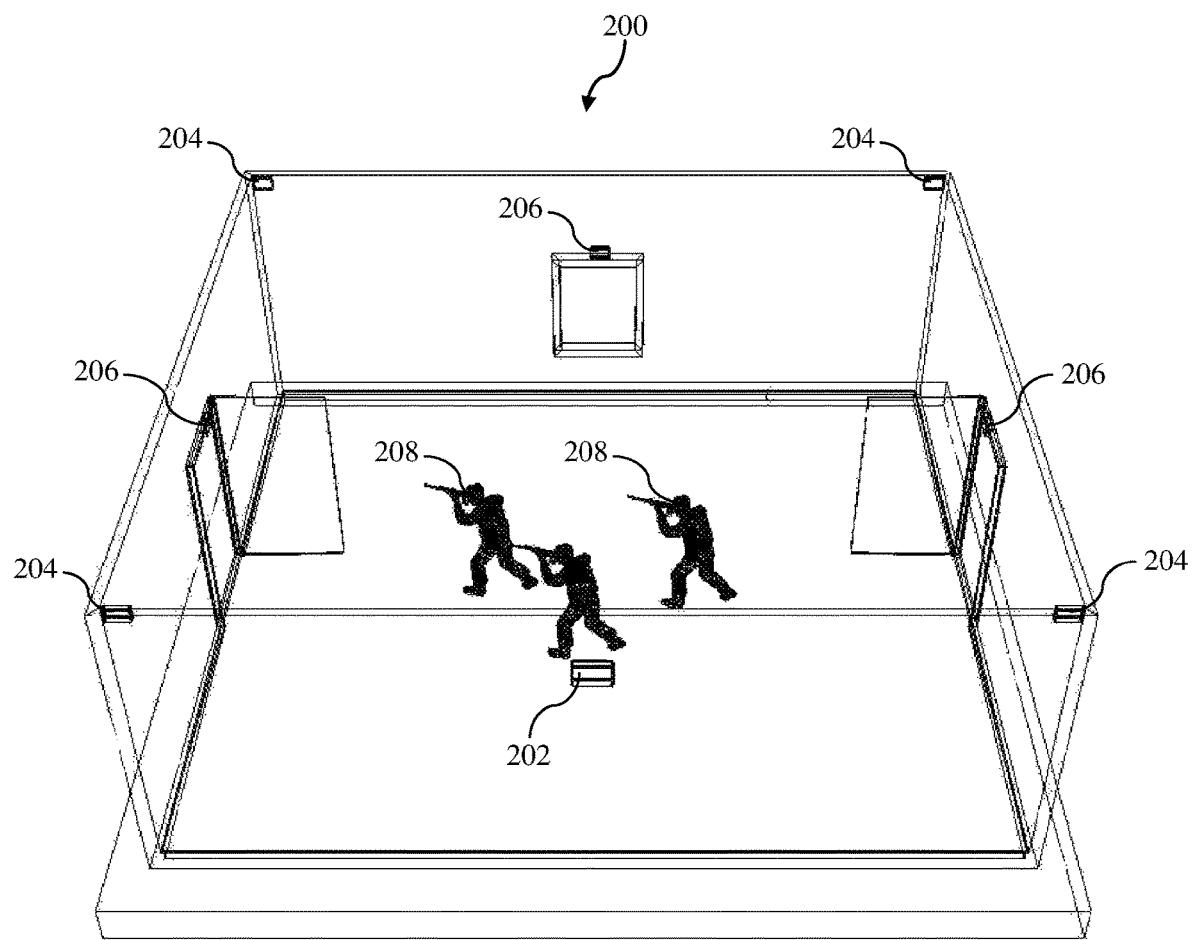
FIG. 2 illustrates a perspective view of a room with tags according to the present invention.

FIG. 2 illustrates a perspective view 200 of a room with tags according to the present invention. An initiator (202) is affixed in the room or building to initiate the plurality of tags (208) when entered in to the pre-determined range of the initiator (202) and to activate the anchors. On initiation, the plurality of tags (208) communicate with the plurality of anchors (204) that are provided at each corners of the room or building to track the location of tags (208). It is mandate to have at least three anchors (204) in each room for seamless and error free tracking. All anchors (204) belonging to a room transfers the tag data to the base station as shown in FIG. 1 in order to track the tags (208) inside a room. Base station monitors the position of tags and to control all devices in a room and a floor.

Indoor tracking system comprises Room Intervention Device (RID) (206) to switch the channel. Each room belonging to a floor uses a different channel ID and a room ID, as the floor changes the floor ID of the anchors changes. The RID's (206) are placed at every entrance and exit of a room to ensure the tag (208) belongs to that particular room of a floor.

Figure 3:
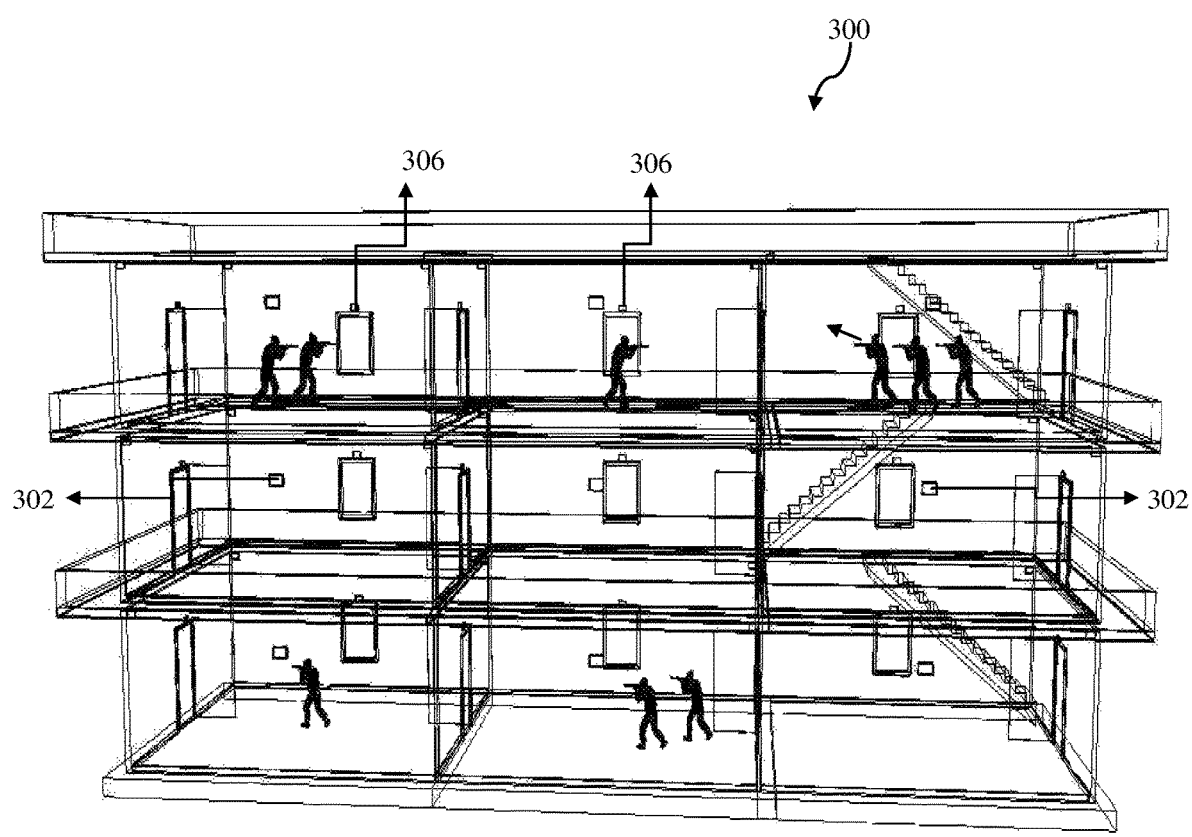
FIG. 3 illustrates a perspective view of a building with tags according to the present invention.

FIG. 3 illustrates a perspective view 300 of a building with Indoor tracking system according to the present invention. The indoor tracking system can be used to track the tags (308) in multiple rooms and multiple floors of a building (300). Each room is provided with an initiator (302), four anchors (304) not shown and room intervention devices (306) and each device is provided with a unique ID. The communication between all the devices is achieved through wireless communication.

Referring to the drawings, FIG. 1 a method to operate the indoor tracking system (100) to track a location of a tag (108) is disclosed. The method comprises steps of affixing an initiator (102) in the room or building to initiate the plurality of tags (108), providing a plurality of anchors (104) at each corner of the room or building for seamless and error free tracking and communicating with the anchors (104), on initiating the tags (108).

Further the method comprises steps of placing Room Intervention Device (RID) at every entrance and exit of a room or building to ensure the said tag (108) belongs to the particular room of the floor and transferring the tag data to the base station (110) to track the tags (108) inside the room, where in each tag (108), anchor (104) and initiator (102) are fed with unique ID's.

What is claimed is:

1. An indoor tracking system to track a location of a tag, the indoor tracking system comprising:
    an initiator to initiate the tags, wherein the said tags are moving subjects in a room or in a building, and are equipped with a transceiver for communication, and wherein the initiator is affixed in a room or a building;
    a plurality of anchors to track the location of the tag in a pre-determined range;
    one or more Room Intervention Devices (RID's) placed at entrances and exits of the room to ensure the tags belong to a particular room of a floor of the building, the one or more RIDs configured to switch a channel of the tag and change a room ID and a floor ID of the tag; and
    a base station to monitor a position of the tags and to control the devices in a room and a floor,
    wherein each of the tag, the anchor and the initiator are fed with unique ID's.

2. The indoor tracking system according to the claim 1, wherein the initiator initiates the tags when entered in to a pre-determined range and initiate the anchors to perform the operation.

3. The indoor tracking system according to the claim 1, wherein the anchors track the exact location of the tags.

4. The indoor tracking system according to claim 1, wherein the anchors are feed with at least three anchors in each room to measure a tag distance between each anchor and to calibrate the distance automatically within a time interval.

5. The indoor tracking system according to the claim 1, wherein the base station continuously monitors exercises of the tags.

6. The indoor tracking system according to the claim 1, wherein the base station controls the RIDs in plurality of rooms and floors.

7. The system according to claim 1, wherein the communication between the initiators, the plurality of anchors, the RIDs and the base station are achieved through wireless communication.

8. The system according to claim 1, wherein the tags are moving subjects selected from a group comprising people, animal, object or vehicle.

9. The system according to claim 1, used for armed personnel training and gaming.

10. A method to operate an indoor tracking system to track a location of a tag or a plurality of tags, the method comprising:
    affixing, an initiator in a room or a building to initiate the plurality of tags and anchors;
    providing, a plurality of anchors at each corner of a room or a floor or a building for seamless and error free tracking;
    communicating, with the anchors, on initiating the tags;
    placing, a Room Intervention Device (RID) at every entrance and exit of the room or the building to ensure the said tag belongs to a particular room of a floor of the building, the RIDs configured to switch a channel of the tag and change a room ID and a floor ID of the tag;
    transferring, tag data and each anchor data to the base station to track the tags inside the room; and
    base station to monitor a position of the tags and to control the initiator and the RID in the room, the floor and the building,
    wherein each of the tag, the anchor and the initiator are fed with unique ID's.

11. The method according to the claim 10, initiator characterized to initiate the tags when entered in to a pre-determined range and initiate the anchors to perform the operation.

12. The method according to claim 10, wherein the plurality of anchors is feed with at least three anchors in each room to measure a tag distance between each anchor and to calibrate the tag distance automatically within the time interval.

13. The method according to the claim 10, wherein the said tags are moving subjects selected from a group comprising people, animal, object or vehicle.

14. The method according to the claim 10, used for armed personnel training and gaming.

* * * * *